United States Patent [19]
Otake

[11] Patent Number: 6,084,948
[45] Date of Patent: Jul. 4, 2000

[54] VOICE MONITORING SYSTEM FOR REMOTE SUBSCRIBERS

[75] Inventor: Kiyomi Otake, Tokyo, Japan

[73] Assignee: NEC Corporation, Tokyo, Japan

[21] Appl. No.: 09/104,222

[22] Filed: Jun. 25, 1998

[30] Foreign Application Priority Data

Jun. 27, 1997 [JP] Japan ................................. 9-171938

[51] Int. Cl.$^7$ .............................. H04M 1/24; H04M 3/00
[52] U.S. Cl. ............................ 379/35; 379/189; 379/196; 379/377
[58] Field of Search ................................. 379/34, 35, 7, 379/189, 196, 188, 329, 341, 343, 350, 351, 382, 386, 1

[56] References Cited

U.S. PATENT DOCUMENTS

| | | | |
|---|---|---|---|
| 5,471,519 | 11/1995 | Howe et al. ................................ | 379/34 |
| 5,745,558 | 4/1998 | Richardson, Jr. et al. ................ | 379/35 |
| 5,796,811 | 8/1998 | McFarlen ................................. | 379/196 |

FOREIGN PATENT DOCUMENTS 59-165555  9/1984  Japan .

*Primary Examiner*—Paul Loomis
*Attorney, Agent, or Firm*—Whitham, Curtis & Whitham

[57] ABSTRACT

The present invention provides a voice monitoring system for remote subscribers, which enables voice monitoring for even those calls which are set in speech mode after connected by drop-back in remote local equipment without the intervention of a time division switch in a telephone network. The voice monitoring system for remote subscribers offered by this invention is intended for voice monitoring for subscribers accommodated by remote local equipment connected to a time division switch in a telephone network. Primarily, this system comprises connection means for providing monitoring paths in the concentrator in the remote local equipment and connecting speech paths for subscribers in speech mode to these monitoring paths, supervision means for supervising the call statuses of subscribers accommodated by the remote local equipment connected to a time division switch of telephone network, a trunk for three party speech handled by the time division switch of telephone network, and a voice monitoring telephone connected to one circuit of the trunk for three party speech, and connects the monitoring paths provided in the remote local equipment to two circuits of the trunk for three party speech, according to the call statuses of subscribers.

4 Claims, 3 Drawing Sheets

VOICE MONITORING SYSTEM FOR REMOTE SUBSCRIBERS

BACKGROUND OF THE INVENTION

1. Field of the Invention

The present invention relates to a voice monitoring system for subscribers handled by time division switches in a telephone network, particularly for subscribers accommodated by remote (site) local equipment.

2. Description of the Related Art

A previously presented voice monitoring system for subscribers handled by telephone network's time division switches was like the one shown in FIG. 3 (Japanese Published Unexamined Patent Application No. Sho 59-165555). Summarizing this previous system by referring to FIG. 3 is as follows.

Assume that a subscriber 1 is placed in the speech state, using a trunk 3. Given that a request for monitoring for the trunk 3 is issued from a monitor console 6 in this case, an activation signal is first transmitted from the monitor console 6 to a trunk for monitor console 7. When a time division switch of the telephone network detects the activation signal received by the trunk for monitor console 7, it makes the connection between the trunk for monitor console 7 and an MF receiver 8 via a path 10. When the monitor console 6 is thus connected to the MF receiver 8, it transmits a circuit number in the trunk 3 for which it desires monitoring as number information to the MF receiver 8. Then, the time division switch of the telephone network releases the path 10 that was used for the connection between the trunk for monitor console 7 and the MF receiver 8, selects an idle trunk for three party speech 5 and establishes the connection between monitor connection paths 11, 12, and 13 to complete the connection for the requested monitoring.

SUMMARY OF THE INVENTION

The primary problem of the previous technology is that voice monitoring cannot be performed for the calls connected by drop-back within remote local equipment.

This is because only time division switches in a telephone network make the connection of monitoring paths and it is impossible to make any monitoring path connection for the calls connected by drop-back within remote local equipment.

An object of the present invention is to provide a voice monitoring system for remote subscribers so that voice monitoring even for those calls which are set in speech mode after connected by drop-back within remote local equipment can be performed without the intervention of a time division switch of the telephone network. In addition, this system improves the maintainability of time division switches in a telephone network.

The voice monitoring system for remote subscribers offered by the present invention has means for making the connection of monitoring paths within a concentrator of subscribers.

This system also has means for switchover between the monitoring paths within the concentrator of subscribers, according to the statuses of subscribers.

This system always supervises the statuses of the speech paths for subscribers under monitoring. Thus, it can make the connection of multiplex monitoring paths in parallel with a speech path in the concentrator of subscribers to be used when the status change of subscribers occurs.

DETAILED DESCRIPTION OF THE PREFERRED EMBODIMENTS

First, the overview of one preferred embodiment of the present invention is detailed below, referring to the related drawing.

Figure 1:
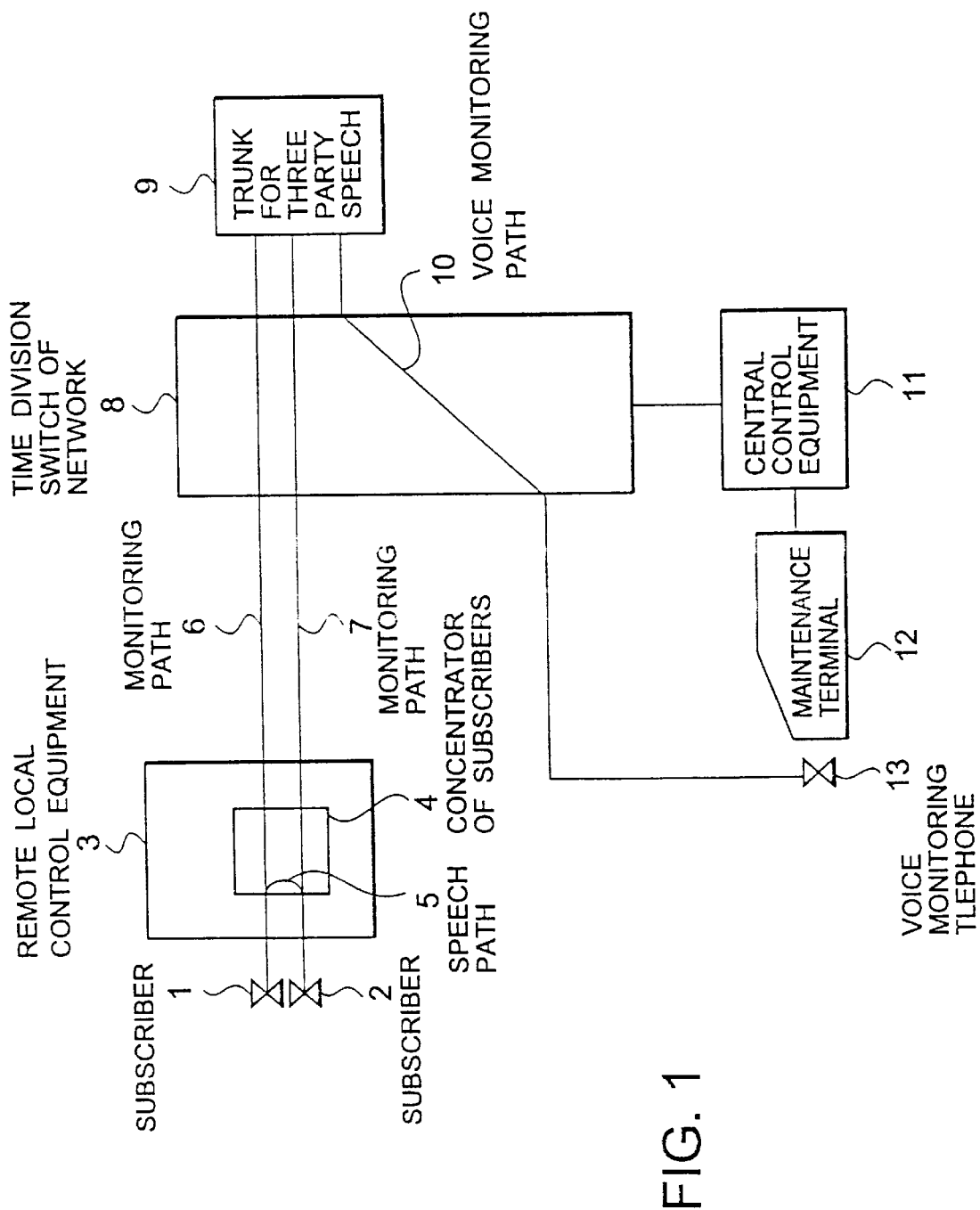
FIG. 1 is a schematic drawing showing one preferred embodiment of the voice monitoring system for subscribers offered by this invention.

In one preferred embodiment of this invention, which is presented with reference to FIG. 1, subscribers 1 and 2 subjected to monitoring are accommodated by remote local control equipment 3. The remote local control equipment 3 is placed far away from a time division switch of network 8 and its task is to report status change of subscribers accommodated by it to a central control equipment 11 and exercise the control over the subscribers as instructed by the central control equipment 11. A concentrator of subscribers 4 carries out concentrating subscribers onto a circuit as instructed by the remote local control equipment 3. The time division switch of network 8 carries out the control over paths under the control of the central control equipment 11.

A trunk for three party speech 9, to which the voice carried over monitoring paths 6 and 7 are input, performs voice mixing inside it and outputs the resulting voice to a voice monitoring path 10.

A maintenance terminal 12 is used to transmit voice monitoring requests from maintenance personnel and the information for subscribers to be monitored to the central control equipment 11.

A voice monitoring telephone 13 is exclusively used to monitor the voice without originating a call from itself and receiving an incoming call.

A speech path 5 is the path for call connection called drop-back, by which calls can be set up between only the subscribers within the same remote local control equipment 3. This path is effective in saving the resources between the remote local control equipment 3 and the time division switch of network 8.

Then, the operation in the above preferred embodiment of the present invention is detailed below, referring to FIG. 1.

When a voice monitoring request and the information for a subscriber 1 to be monitored are input from the maintenance terminal 12, this request and the related information are transmitted to the central control equipment 11. According to the received information, the central control equipment 11 seizes monitoring paths 6 and 7. Then, it seizes an idle trunk for three party speech 9 and instructs the time division switch of network 8 to connect this trunk to the monitoring paths 6 and 7. The central control equipment 11 also transmits the voice monitoring request and determines a voice monitoring telephone 13 to be associated with the maintenance terminal 12, and after seizing a voice monitoring path 10, it instructs the time division switch of network 8 to make the connection between the trunk for three party speech 9 and the voice monitoring path 10.

Then, the central control equipment 11 transmits the information about subscriber 1, subscriber 2 which is placed in the status of drop-back connection with subscriber 1, and monitoring paths 6 and 7 to the remote local control equipment 3 that accommodates the subscriber 1 and instructs this equipment to execute the voice monitoring control. The remote local control equipment 3 controls the concentrator of subscribers 4 so the voice of subscriber 1 will be output to the speech path 5 and the monitoring path 6 and the voice of subscriber 2 will be output to the speech path 5 and the monitoring path 7.

Next, a second preferred embodiment of this invention is detailed below, referring to the related drawing.

Figure 2:
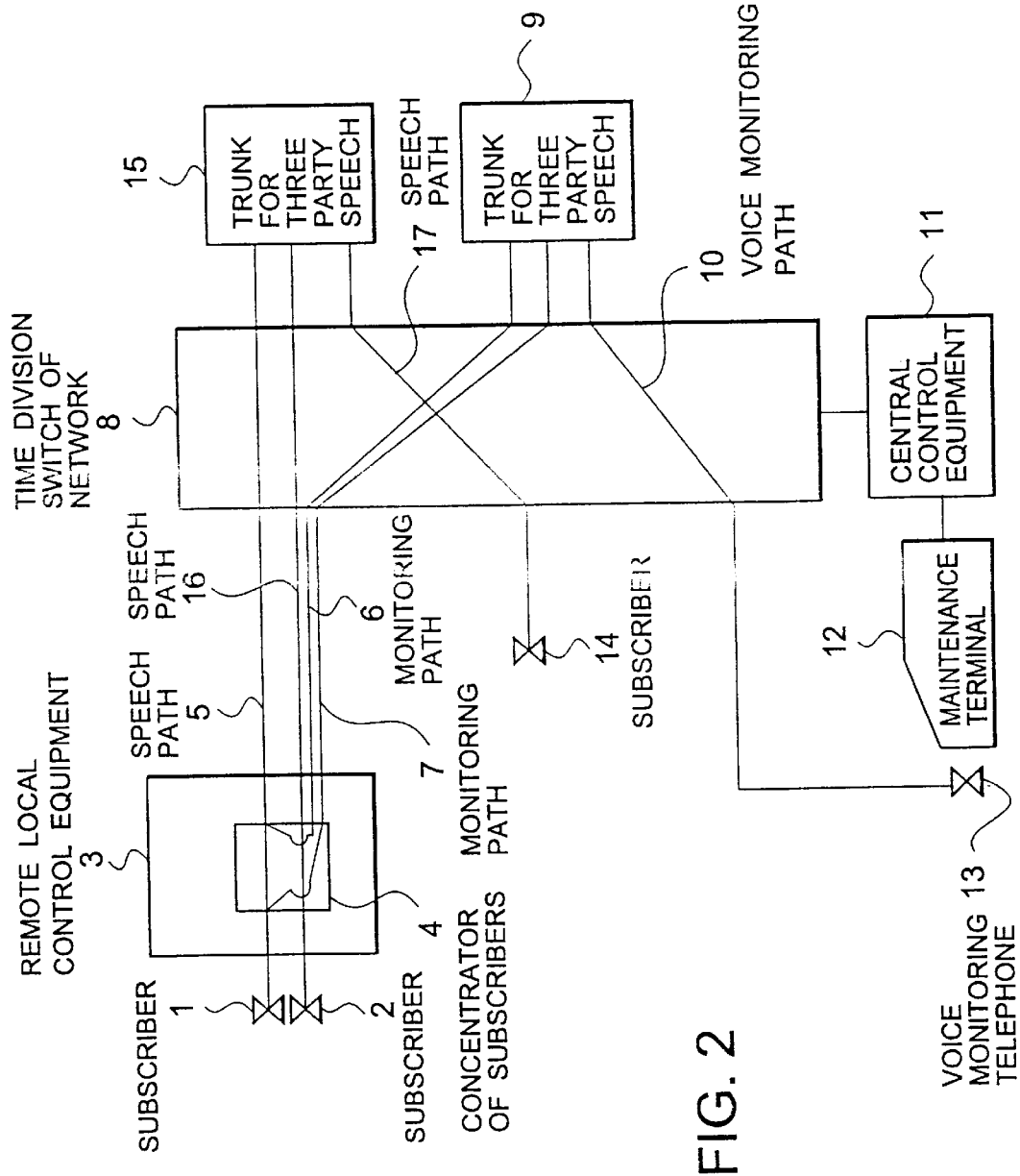
FIG. 2 is a schematic drawing showing another preferred embodiment of this invention.
Figure 3:
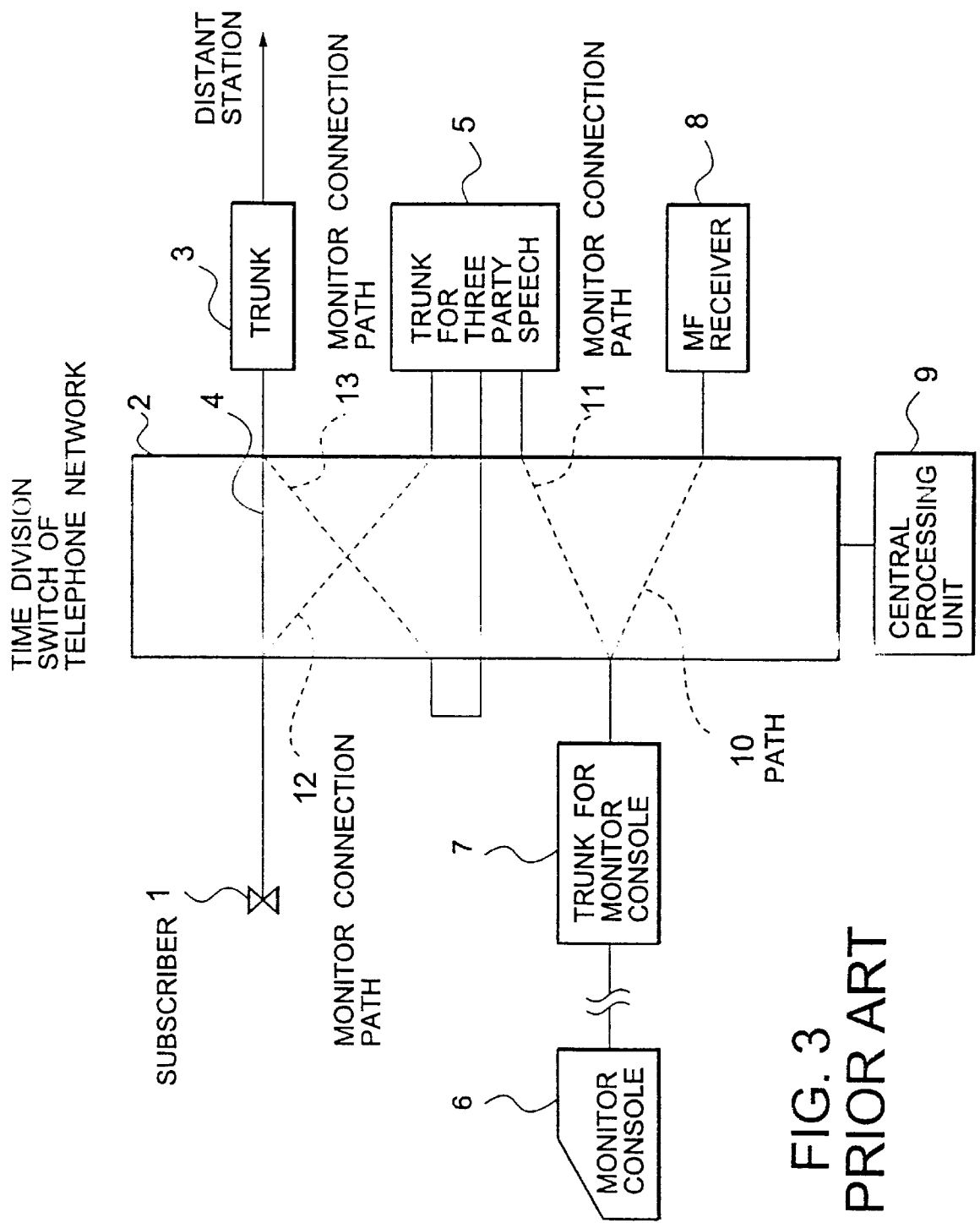
FIG. 3 is a relaying system drawing showing one example of the implementation of the previous voice monitoring system.

In the second aspect of this invention with reference to FIG. 2, subscribers 1, 2, and 14 are placed in the three party speech status and the drop-back connection in the concentrator of subscribers 4 has been released and speech paths 5, 16, and 17 interconnected in this state. Also, a new trunk for three party speech 15 must have been seized. In this case, the voice toward the subscriber 1 transmitted from the trunk for three party speech 15 over the speech path 5 is output to a monitoring path 6. At the same time, the voice toward the trunk for three party speech 15 transmitted from the subscriber 1 over the speech path 5 is output to a monitoring path 7.

Now, even if the subscriber 2 hangs up and leaves the three party speech status, the speech path 5 remains as it is and the voice monitoring for the speech between the subscriber 1 and the subscriber 14 can be continued.

The subscriber 14 may or may not be accommodated by remote local equipment and even if the subscriber 14 is handled by another switching station, it is not necessary to change the monitoring path 6.

The first fruitful result is that voice monitoring can be performed for those calls that have been connected by drop-back within remote local equipment.

This is because the concentrator of subscribers in the remote local equipment can make the connection of monitoring paths, and therefore even the calls connected by drop-back in the remote local equipment without the intervention of a time division switch of network can be monitored.

The second fruitful result is that voice monitoring can be performed for even the speech for which complex path control is required upon the activation of a new service.

This is because the path control required upon the activation of a new service is carried out via a time division switch of network and the operation of the concentrator of subscribers does not change.

What is claimed is:

1. A monitor system for monitoring the voice of subscribers accommodated by remote local equipment connected to a time division switch in a telephone network, wherein the voice monitoring system for remote subscribers comprising:

first connection means for providing monitoring paths in the concentrator in the remote local equipment and connecting speech paths for subscribers set in speech mode to said monitoring paths;

supervision means for supervising the call statuses of subscribers accommodated by the remote local equipment connected to the time division switch in the telephone network;

voice monitoring telephone connected to one circuit of a trunk for three party speech handled by the time division switch in the telephone network; and second connection means for connecting the monitoring paths provided in the remote local equipment to the remaining two circuits of said trunk for three party speech, according to the call statuses of said subscribers.

2. The voice monitoring system for remote subscribers according to claim 1, wherein the first connection means for connecting the speech paths for subscribers set in speech mode to said monitoring paths comprise the primary connection means for making speech path connection called drop-back by which calls can be connected between only the subscribers within said remote local equipment.

3. The voice monitoring system for remote subscribers according to claim 1, wherein the second connection means for connecting the monitoring paths provided in the remote local equipment to the remaining two circuits of said trunk for three party speech comprise the second connection means by which the information for a first subscriber accommodated by the remote local equipment, a second subscriber connected to the first subscriber by drop-back, and said two circuits is transmitted to the time division switch in the telephone network and the remote local equipment, as instructed by the time division switch to execute voice monitoring, outputs the voice of the first subscriber to the speech path used for the drop-back connection and one monitoring path and the voice of the second subscriber to said speech path and another monitoring path.

4. Another monitor system for monitoring the voice of subscribers accommodated by remote local equipment connected to a time division switch in a telephone network, wherein the voice monitoring system for remote subscribers comprising:

first connection means for providing monitoring paths in the concentrator in the remote local equipment and connecting speech paths for subscribers set in speech mode to said monitoring paths;

supervision means for supervising the call statuses of subscribers accommodated by the remote local equipment connected to the time division switch in the telephone network;

voice monitoring telephone connected to one circuit of a trunk for three party speech handled by the time division switch in the telephone network;

second connection means for connecting the monitoring paths provided in the remote local equipment to the remaining two circuits of said trunk for three party speech, according to the call statuses of said subscribers; and third connection means for connecting said monitoring paths, one of which to the outgoing side and the other to the incoming side of a subscriber's circuit in speech mode in said remote local equipment, by releasing the drop-back connection path in said local equipment and using the result of said second connection means when said two subscribers in speech mode and another subscriber are executing third party speech.

* * * * *